United States Patent
Li

(10) Patent No.: US 8,422,521 B2
(45) Date of Patent: Apr. 16, 2013

(54) LASER DEVICE OF EQUAL-ENERGY PULSE SYNCHRONOUS WITH MOTION

(76) Inventor: Chun-Hao Li, Taipei (TW)

( * ) Notice: Subject to any disclaimer, the term of this patent is extended or adjusted under 35 U.S.C. 154(b) by 0 days.

(21) Appl. No.: 13/335,331

(22) Filed: Dec. 22, 2011

(65) Prior Publication Data

US 2012/0170601 A1    Jul. 5, 2012

(30) Foreign Application Priority Data

Jan. 4, 2011    (TW) .............................. 100100235 A

(51) Int. Cl.
*H01S 3/13* (2006.01)

(52) U.S. Cl.
USPC ............. 372/30; 372/29.02; 372/29.011; 372/29.01; 372/12; 372/13; 372/26; 372/21

(58) Field of Classification Search ............. 372/30, 372/29.02, 29.022, 29.01, 12, 13, 26, 21
See application file for complete search history.

(56) References Cited

U.S. PATENT DOCUMENTS

| 6,080,148 A * | 6/2000 | Damasco et al. ............. 606/10 |
| 2008/0124816 A1 * | 5/2008 | Bruland et al. .................. 438/6 |

* cited by examiner

*Primary Examiner* — Kinam Park
(74) *Attorney, Agent, or Firm* — Muncy, Geissler, Olds & Lowe, PLLC

(57) ABSTRACT

A laser device of an equal-energy pulse synchronous with motion includes: a resonant cavity, outputting a plurality of pulses with stable pulse-width and energy; a beam switch modulator, selectively enabling one of the pulses to pass; a beam energy modulator, adjusting the energy of the pulse according to a power feedback signal; an optical power sensor, sensing the energy and the pulse-width of the pulse; a motion controller, providing processing motion information; an optical feedback controller, outputting the power feedback signal to the beam energy modulator according to the energy of the pulse and the processing motion information; a trigger controller, measuring a time difference between time when the pulse is triggered and time when the optical power sensor detects the pulse, and correcting a turn-on time point of the beam switch modulator. The processing quality is therefore stabilized, and the device is applicable to various laser industrial processes.

9 Claims, 4 Drawing Sheets

LASER DEVICE OF EQUAL-ENERGY PULSE SYNCHRONOUS WITH MOTION

CROSS-REFERENCES TO RELATED APPLICATIONS

This non-provisional application claims priority under 35 U.S.C. §119(a) on Patent Application No. 100100235 filed in Taiwan, R.O.C. on 2011 Jan. 4, the entire contents of which are hereby incorporated by reference.

BACKGROUND

1. Technical Field

The disclosure relates to a laser device, and more particularly to a laser device of an equal-energy pulse synchronous with motion.

2. Related Art

Commercial application of lasers is wide; they can be used for processing purposes such as marking, scribing and fracturing in industry applications. Usually, in order to achieve high-quality beam output of a laser resonant cavity, the design of a laser processing device for the above purposes usually pursues physical performance and specification of the laser.

However, an excitation source in the resonant cavity must be adjusted frequently due to a power requirement, causing an unstable heat balance in the resonant cavity; a heat drift phenomenon occurs at assemblies in the resonant cavity, which makes output energy of the laser unstable.

Furthermore, a quality switch (Q-switch), in the resonant cavity adjusts a switch frequency as a frequency of the output pulse changes, causing an unstable accumulated energy output, so that it is difficult to maintain the heat balance in the resonant cavity, and the stability of the output energy of the laser is also affected.

In addition, laser processing is usually in coordination with a motion system, so that the laser and a processing member move relatively, to achieve processing such as marking and cutting. Therefore, if the laser trigger and the motion system are asynchronous, unstable random processing point is generated, thereby affecting the processing quality.

SUMMARY

Existing laser devices still fail to maintain stable energy output, and laser trigger and motion control are asynchronous. In view of these problems, the disclosure is directed to a laser device of an equal-energy pulse synchronous with motion, to facilitate improvement of the laser processing quality.

In an embodiment, a laser device of an equal-energy pulse synchronous with motion includes a resonant cavity, a beam switch modulator, a beam energy modulator, an optical power sensor, an optical feedback controller, a trigger controller and a motion controller.

The resonant cavity outputs a plurality of pulses with stable pulse-width and energy. The beam switch modulator selectively enables one of the pulses output by the resonant cavity to pass. The beam energy modulator adjusts the energy of the pulse passing through the beam switch modulator according to a power feedback signal, and outputs the pulse for processing. The optical power sensor senses the energy and the pulse-width of the pulse output by the beam energy modulator. The optical feedback controller is connected electrically between the optical power sensor and the beam energy modulator, and outputs the power feedback signal to the beam energy modulator according to a piece of processing motion information and the energy sensed by the optical power sensor. The processing motion information includes a relative motion parameter for the pulse and a processing member. The trigger controller is connected electrically to the optical power sensor and the beam switch modulator. The trigger controller triggers the beam switch modulator to turn on, measures a time different between time of the trigger and time when the optical power sensor detects the pulse, and corrects a turn-on time point of the beam switch modulator according to the time difference and the processing motion information. The motion controller is connected electrically to the optical feedback controller and the trigger controller, and transmits the processing motion information to the optical feedback controller and the trigger controller.

Through the disclosed laser device, the resonant cavity maintains heat balance to output pulses of fixed energy stably, and the beam switch modulator outside the resonant cavity selects a pulse according to a required frequency and enables the pulse to pass, achieving an effect of outputting the laser pulses with equal energy. In addition, the time difference between the trigger and the output of the pulse is compensated in coordination with a motion system, and the processing can be performed at a preset processing position.

BRIEF DESCRIPTION OF THE DRAWINGS

The disclosure will become more fully understood from the detailed description given herein below for illustration only, and thus are not limitative of the disclosure, wherein.

DETAILED DESCRIPTION

The following embodiments are provided for describing the content of the disclosure in detail, and the accompanying drawings are provided as supplementary description. Symbols mentioned in the specification are symbols of the reference drawings.

Figure 1:
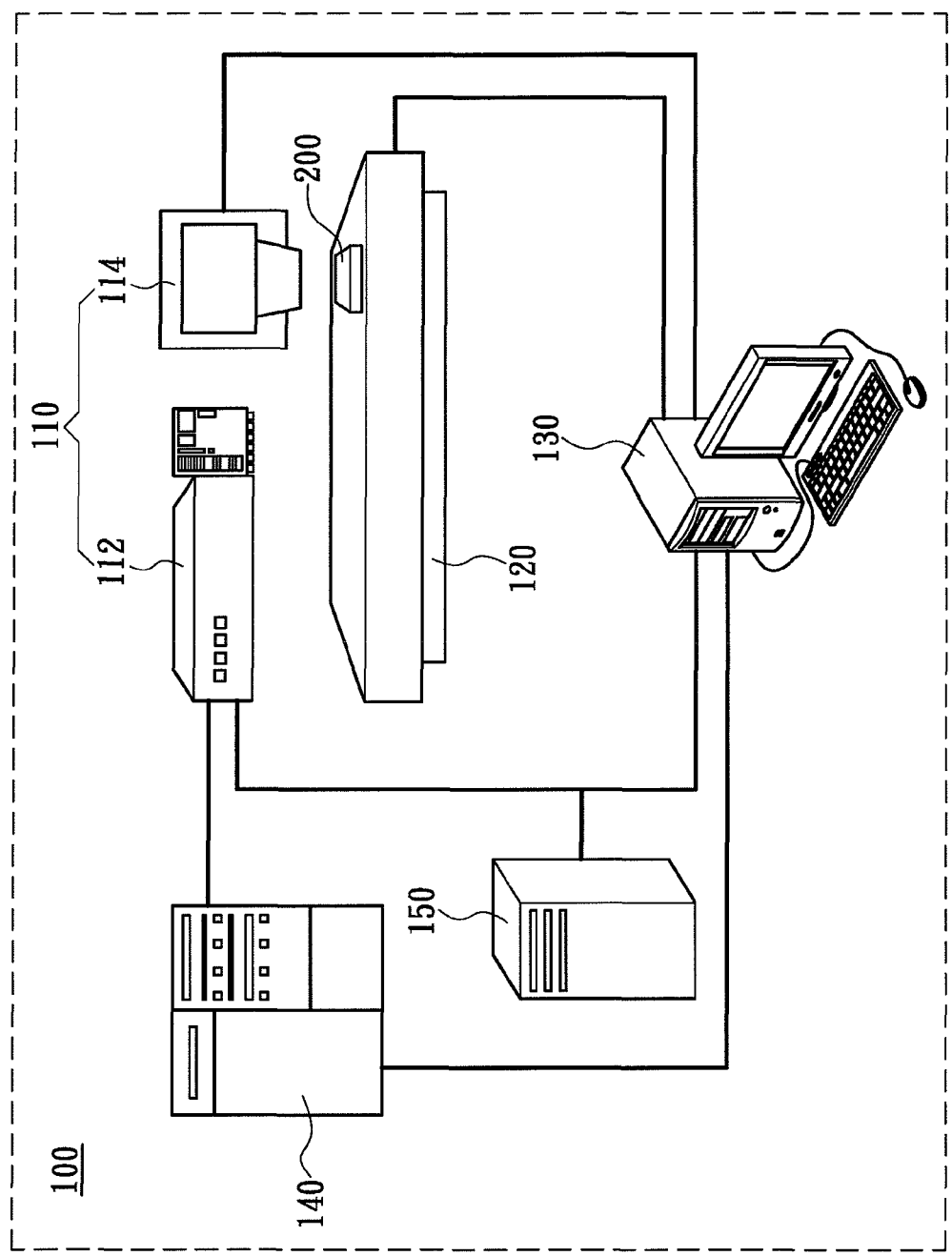
FIG. 1 is a schematic diagram of a laser device according to an embodiment.

Please refer to FIG. 1, in which a laser device according to an embodiment is shown for disclosing an actual position relation between a laser device 100 and a processing member 200 during processing. The laser device 100 includes a laser module 110, a motion platform 120, a console 130, a power supply module 140 and a cooling module 150.

As shown in FIG. 1, the laser module 110 includes a laser light path 112 and a laser head 114. The laser light path 112 is used for generating laser light. The laser head 114 is used for outputting the laser light for processing. The motion platform 120 bears the processing member 200, and can move the processing member 200 horizontally and vertically, so that the processing member 200 and the laser light move relatively, to perform processing such as marking and cutting. The console 130 is used for setting a laser parameter related to the laser module 110 and a motion parameter related to the motion platform 120. In addition, the console 130 is also used for controlling the cooling module 150. The power supply module 140 is used for providing power required by the laser module 110 and the console 130. The cooling module 150 is connected to the laser module 110, for cooling the laser module 110. Preferably, the cooling module 150 may include a Thermoelectric Cooling (TEC), a water cooler, a cold air compressor or a combination thereof, and is used for thermostatic control.

Figure 2:
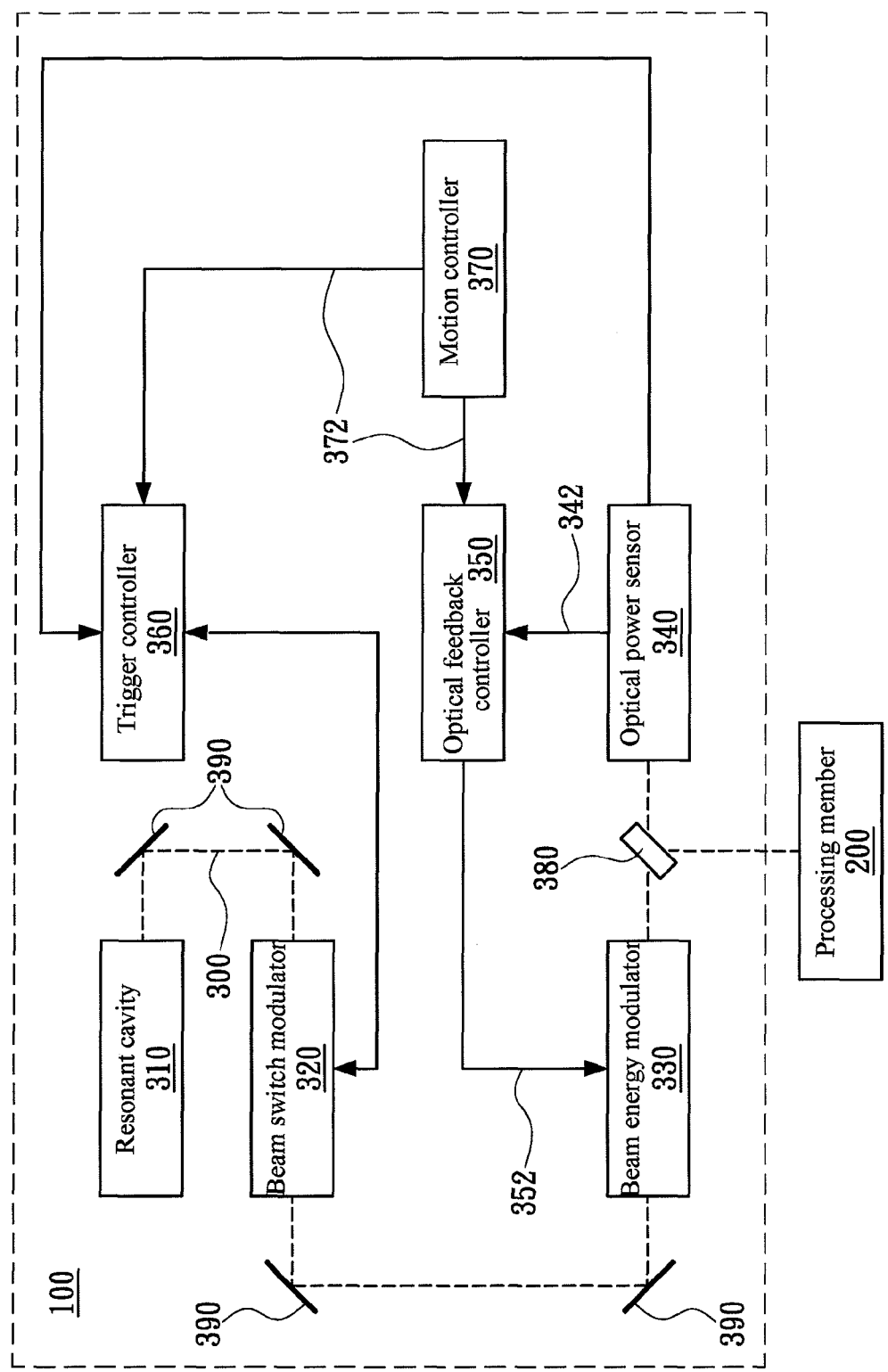
FIG. 2 is a schematic block diagram of an embodiment.

Please refer to FIG. 2, in which a schematic block diagram of an embodiment is shown. The laser device 100 of an equal-energy pulse synchronous with motion is used for processing the processing member 200. The laser device 100 includes a resonant cavity 310, a beam switch modulator 320, a beam energy modulator 330, an optical power sensor 340, an optical feedback controller 350, a trigger controller 360 and a motion controller 370. Preferably, the resonant cavity 310, the beam switch modulator 320, the beam energy modulator 330, the optical power sensor 340, the optical feedback controller 350 and the trigger controller 360 are located in the laser module 110 of FIG. 1; the motion controller 370 is located on the motion platform 120 of FIG. 1.

Figure 3:
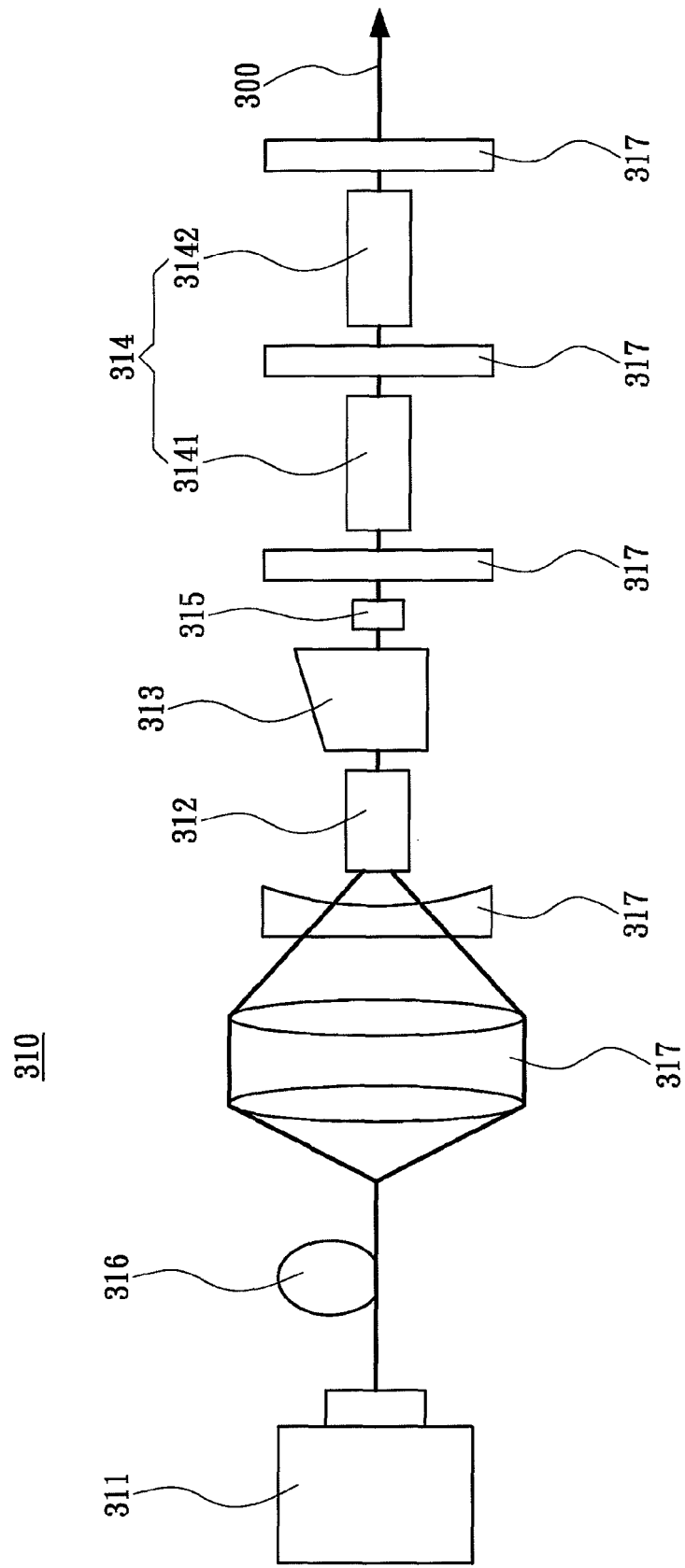
FIG. 3 is a schematic block diagram of a resonant cavity according to an embodiment.

Please refer to FIG. 3, in which a schematic block diagram of a resonant cavity 310 according to an embodiment is shown, where a semiconductor laser is taken as an example. The resonant cavity 310 includes a laser diode 311, a laser crystal 312, a Q-switch 313 and a frequency multiplication module 314. Preferably, the laser diode 312 is an array of diodes; the Q-switch 313 is substantially an acoustic-optic modulator; the frequency multiplication module 314 includes at least a non-linear crystal, for example, the original laser frequency is tripled through a combination of a frequency-doubling crystal 3141 and a sum-frequency crystal 3142. The Q-switch 313 may trigger the resonant cavity 310 to output a pulse 300, and decide pulse-width of the pulse 300. Consequently, the resonant cavity 310 can continuously output a plurality of pulses 300 with the same pulse-width. In addition, heat balance is maintained in the resonant cavity 310, so that a situation of unstable power of the pulse 300 due to heat drift does not occur at assemblies in the resonant cavity 310, ensuring the energy of each pulse 300 remains stable. Here, the pulse 300 is substantially pulse light, near-continuous light or long-pulse light.

Please refer to FIG. 3, in which the resonant cavity 310 further includes an aperture grating 315 located between the Q-switch 313 and the frequency-doubling crystal 3141, to generate the pulses 300 of a single mode, avoiding a power change of the pulses 300 due to multiple modes, so that the energy of the pulses 300 is more stable. However, persons of ordinary skill in the art should understand that the pulses 300 in the single mode can meet the high-quality processing requirement; however, if the pulses 300 is in multiple modes, a stable output can still be generated. In addition, an optical fiber 316 and a light path lens group 317 including a plurality of lenses may be included among the assemblies of the resonant cavity 310 to modulate the light path.

Figure 4:
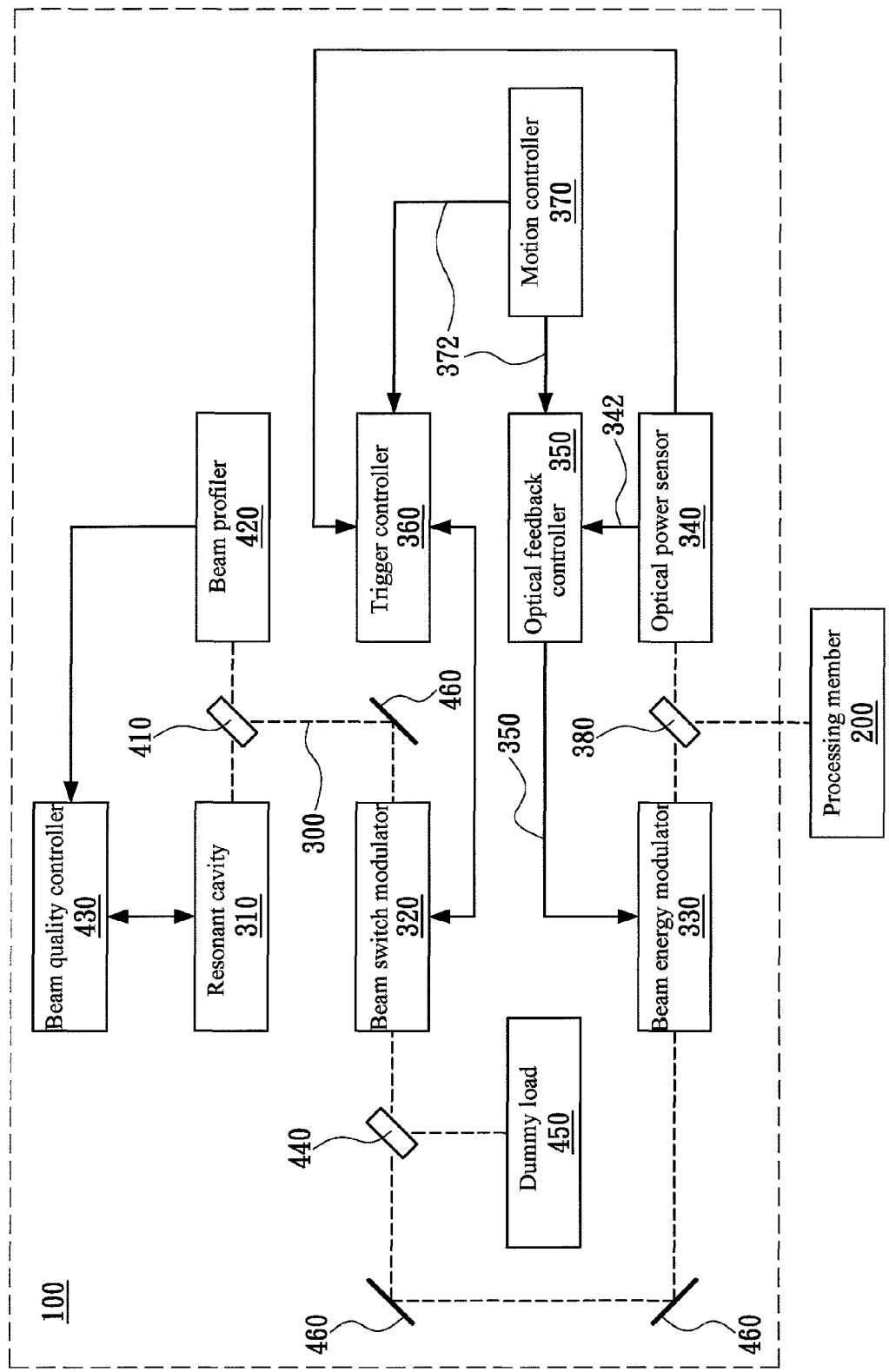
FIG. 4 is another schematic block diagram of an embodiment.

To make the description smooth, FIG. 4 demonstrates how the resonant cavity 310 maintains the heat balance. The following paragraphs continue to describe the other assemblies, except for the resonant cavity 310 in FIG. 2.

Please refer to FIG. 2, in which the beam switch modulator 320 receives the plurality of pulses 300 output by the resonant cavity 310, and selectively enables one of the pulses 300 to pass through the beam switch modulator 320. Here, the beam switch modulator 320 may be an acoustic-optic modulator or an electro-optic modulator. In this manner, through the resonant cavity 310 with stable energy output in coordination with the beam switch modulator 320 outside the resonant cavity 310, the pulses 300 may be generated according to requirements, and the energy of the pulses 300 can further maintain stability.

As shown in FIG. 2, after the beam energy modulator 330 adjusts the energy of the pulse 300 passing through the beam switch modulator 320 according to a power feedback signal 352, the laser device 100 outputs the pulse 300 to process the processing member 200. The resonant cavity 310 stabilizes the energy of the pulse 300 output by the resonant cavity 310 through heat balance control. However, as a matter of fact, due to stabilization limits of the assemblies in the resonant cavity 310, the energy of the pulse 300 output by the resonant cavity 310 still changes by a range of about 3% to 5%. Therefore, fine tuning needs to be performed on the energy of the pulse 300 output by the beam switch modulator 320 through the beam energy modulator 330. The beam energy modulator 330 has a high-bit digital analog circuit, and is capable of performing high-precision control. Preferably, the beam energy modulator 330 may be an acoustic-optic modulator. After the beam energy modulator 330 performs fine tuning on the energy of the pulse 300, each pulse 300 output by the laser device 100 can maintain the same energy level.

The laser device 100 further includes a first beam splitter 380 for splitting the pulse 300 output by the beam energy modulator 330, so that the split pulse 300 is received by the optical power sensor 340 and the processing member 200 respectively. In this way, while the pulse 300 is processing the processing member 200, the energy and the pulse-width of the pulse 300 can be sensed through the optical power sensor 340. Preferably, the first beam splitter 380 substantially may be a polarizer, especially a circular polarization lens, to perform circular polarization on the pulse 300 for being output to the processing member 200, so that spots and energy of the pulse 300 are distributed uniformly. In addition, the laser device 100 further includes a plurality of reflectors 390 for forming a light path, to facilitate traveling of the pulse 300.

As shown in FIG. 2, the motion controller 370 is connected electrically to the optical feedback controller 350. The optical feedback controller 350 is connected electrically between the beam energy modulator 330 and the optical power sensor 340. The motion controller 370 is used for transmitting a piece of processing motion information 372 to the optical feedback controller 350 and the trigger controller 360. The processing motion information 372 includes a relative motion parameter for the pulse 300 and the processing member 200, and substantially may be a relative position, a relative motion speed, and relative acceleration for the pulse 300 and the processing member 200, or a parameter that can indicate a motion relation between the pulse 300 and the processing member 200 and can be easily thought of by persons skilled in the art. The optical power sensor 340 senses the power of the output pulse 300, and transmits a power message 342 related to the power of the pulse 300 to the optical feedback controller 350.

Consequently, the optical feedback controller 350 may output the power feedback signal 352 to the beam energy modulator 330 according to the power message 342 and the processing motion information 372. On this basis, the beam energy modulator 330 is aware of the actual output power and an actual processing motion situation of the pulse 300 from a power feedback signal 352, and adjusts the power of the pulse 300 accordingly.

As shown in FIG. 2, the motion controller 370 is connected electrically to the trigger controller 360. The trigger controller 360 is connected electrically to the beam switch modulator 320 and the optical power sensor 340. The trigger controller 360 is used for triggering the beam switch modulator 320 to turn on, and measures a time difference between time of the trigger and time when the optical power sensor 340 detects the pulse 300. The trigger controller 360 corrects a turn-on time point of the beam switch modulator 320 according to the time difference and the processing motion information 372.

In this way, an effect of synchronization between processing and motion can be achieved, especially when a motion speed changes.

For example, when the motion speed slows down, without the above mechanism of synchronization between the processing and the motion, the processing pulse 300 performs processing at a position before an originally predetermined processing position; with the above mechanism of synchronization between the processing and the motion, through temporary turn-off of the beam switch modulator 320, it is predicted that relative motion between the laser head 114 and the processing member 200 proceeds to the originally predetermined processing position according to the aforementioned time difference between the trigger and the output, and the trigger controller 360 triggers the beam switch modulator 320 to turn on, so as to output the pulse 300 for processing.

Please refer to FIG. 4, in which another schematic block diagram of an embodiment is shown, and in addition to the disclosure of FIG. 2, a second beam splitter 410, a beam profiler 420, a beam quality controller 430, a wave selector 440, a dummy load 450 and a reflector 460 are further included.

As shown in FIG. 4, a plurality of reflectors 460 forms a light path, to facilitate traveling of the pulse 300. The second beam splitter 410 is used for receiving the pulses 300 output by the resonant cavity 310, and splits the pulses 300, so that a large part of the pulses 300 travel trough the reflector 460 to the beam switch modulator 320, and a small part of the pulses 300 travel to a beam profiler 420. The beam profiler 420 is used for detecting an optical form of the pulse 300, and obtains at least one optical quality parameter through statistics and analysis of the optical form and loss. The beam quality controller 430 is connected electrically to the beam profiler 420, and adjusts the resonant cavity 310 according to the optical quality parameter. More specifically, the beam quality controller 430 adjusts assemblies such as the laser diode 311, laser crystal 312 and Q-switch 313 in the resonant cavity 310 according to the optical quality parameter, to pre-compensate loss of laser, so that the resonant cavity 310 generates the pulses 300 of stable energy and high-quality spots.

In addition, please refer to FIG. 1 and FIG. 4, in which the beam quality controller 430 also monitors and controls a temperature in the resonant cavity 310. Through sensing of the temperature of the assemblies in the resonant cavity in combination with cooling performed by the cooling module 150, heat balance in the resonant cavity 310 is achieved, and a constant temperature is maintained, so that the assemblies in the resonant cavity 310 is maintained within a temperature range for best properties. Preferably, the temperature range for best properties is 22 degrees Celsius; however, the disclosure is not limited thereto, and adjustment can be performed according to the practical processing requirement.

Further, Please refer to FIG. 4, in which the wave selector 440 is located between the beam switch modulator 320 and the beam energy modulator 330. After the pulse 300 travels through the beam switch modulator 320, the wave selector 440 selects one of a parallel wave (P-wave) and a perpendicular wave (S-wave) of the pulse 300 to pass through the wave selector 440 and arrive at the beam energy modulator 330. In this manner, the P-wave or S-wave can be selected according to a material absorption property of the processing member 200, to meet the processing requirement.

In addition, as the energy of the pulse 300 first triggered by the resonant cavity 310 is greater than a set value, the wave selector 440 may operate in coordination with the beam switch modulator 320 when the first pulse 300 is triggered, so that the first triggered pulse 300 is not output. For example, if the beam switch modulator 320 is an electro-optic switch, the beam switch modulator 320 enables the S-wave of the pulse 300 to pass and be output to the wave selector 440. The wave selector 440 enables the S-wave of the pulse 300 to arrive at the dummy load 450 via a branch path and be absorbed. In this manner, the first pulse 300 may not be output, to maintain the processing quality. The above wave selection is merely an example, and the disclosure is not limited thereto. Persons of ordinary skill in the art should understand that, in the wave selection of the beam switch modulator 320 and the wave selector, the P-wave or S-wave may be selected as a passing wave through control.

In conclusion, the functions of the disclosure are that the energy output by the laser is stabilized and that the laser is triggered in synchronization with motion, so that laser pulses generated through pre-modulation carries the same energy, and act on a fixed-point position. Therefore, the disclosure can stabilize the processing quality, and can be applied to various laser industrial processes.

While the disclosure has been described by the way of example and in terms of the preferred embodiments, it is to be understood that the disclosure need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A laser device of an equal-energy pulse synchronous with motion, comprising:
    a resonant cavity, outputting a plurality of pulses with stable pulse-width and energy;
    a beam switch modulator, selectively enabling one of the pulses output by the resonant cavity to pass;
    a beam energy modulator, adjusting the energy of the pulse passing through the beam switch modulator according to a power feedback signal and outputting the pulse for processing;
    an optical power sensor, sensing the energy and the pulse-width of the pulse output by the beam energy modulator;
    an optical feedback controller, connected electrically between the optical power sensor and the beam energy modulator, and outputting the power feedback signal to the beam energy modulator according to a piece of processing motion information and the energy sensed by the optical power sensor, wherein the processing motion information comprises a relative motion parameter for the pulse and a processing member;
    a trigger controller, connected electrically to the optical power sensor and the beam switch modulator, wherein the trigger controller triggers the beam switch modulator to turn on, measures a time difference between time of trigger and time when the optical power sensor detects the pulse, and corrects a turn-on time point of the beam switch modulator according to the time difference and the processing motion information; and
    a motion controller, connected electrically to the optical feedback controller and the trigger controller, and transmitting the processing motion information to the optical feedback controller and the trigger controller.

2. The laser device according to claim 1, further comprising:
    a beam profiler, detecting an optical form of the pulse output by the resonant cavity to obtain at least one optical quality parameter; and a beam quantity controller, adjusting the resonant cavity according to the at least one optical quality parameter, and controlling a temperature in the resonant cavity, so that heat balance is achieved in the resonant cavity.

3. The laser device according to claim 1, wherein the resonant cavity further comprises at least one non-linear crystal.

4. The laser device according to claim 1, wherein the resonant cavity further comprises an aperture grating, to make the pulse in a single mode.

5. The laser device according to claim 1, further comprising: a quality switch is an acoustic-optic modulator.

6. The laser device according to claim 1, wherein the beam switch modulator is selected from a group of an acoustic-optic modulator and an electro-optic modulator.

7. The laser device according to claim 1, wherein the beam energy modulator is an acoustic-optic modulator.

8. The laser device according to claim 1, further comprising:
  a polarizer, performing circular polarization on the pulse output by the beam energy modulator, and outputting the pulse to the optical power sensor.

9. The laser device according to claim 1, further comprising:
  a wave selector, located between the beam switch modulator and the beam energy modulator, selecting one of a parallel wave (P-wave) and a perpendicular wave (S-wave) of the pulse to pass through the wave selector.

* * * * *